United States Patent
Baheti et al.

(10) Patent No.: US 12,483,523 B2
(45) Date of Patent: Nov. 25, 2025

(54) SYSTEMS AND METHODS FOR PROVIDING DIGITAL ASSISTANCE RELATING TO COMMUNICATION SESSION INFORMATION

(71) Applicant: Avaya Management L.P., Durham, NC (US)

(72) Inventors: Ghanshyam Asaram Baheti, Pune (IN); Harshal Ramesh Gawande, Pune (IN); Ajay Jagdish Talreja, Pune (IN)

(73) Assignee: Avaya Management L.P., Durham, NC (US)

(*) Notice: Subject to any disclaimer, the term of this patent is extended or adjusted under 35 U.S.C. 154(b) by 0 days.

(21) Appl. No.: 17/387,284

(22) Filed: Jul. 28, 2021

(65) Prior Publication Data

US 2023/0036771 A1 Feb. 2, 2023

(51) Int. Cl.
| | |
|---|---|
| H04L 51/04 | (2022.01) |
| G10L 15/22 | (2006.01) |
| H04L 12/18 | (2006.01) |
| H04L 51/10 | (2022.01) |

(52) U.S. Cl.
CPC ............ *H04L 51/04* (2013.01); *G10L 15/22* (2013.01); *H04L 12/1827* (2013.01); *H04L 12/1831* (2013.01); *H04L 51/10* (2013.01)

(58) Field of Classification Search
CPC . H04L 51/04; H04L 12/1827; H04L 12/1831; H04L 51/10; G10L 15/22
See application file for complete search history.

(56) References Cited

U.S. PATENT DOCUMENTS

| | | | |
|---|---|---|---|
| 7,787,609 B1 | 8/2010 | Flockhart et al. | |
| 8,700,665 B2 | 4/2014 | Beauregard et al. | |
| 2011/0264745 A1* | 10/2011 | Ferlitsch | G06Q 10/109 709/204 |
| 2013/0091440 A1* | 4/2013 | Kotler | G06Q 10/10 715/753 |
| 2013/0198288 A1* | 8/2013 | Jones | H04L 65/1066 709/204 |
| 2014/0195621 A1* | 7/2014 | Rao DV | H04L 12/1827 709/206 |
| 2016/0205254 A1* | 7/2016 | Luers | H04M 3/46 379/265.14 |
| 2018/0239753 A1* | 8/2018 | Isensee | G06F 40/279 |
| 2020/0074014 A1* | 3/2020 | Bakir | G10L 13/08 |
| 2020/0314242 A1 | 10/2020 | Matula et al. | |

(Continued)

*Primary Examiner* — Nicholas R Taylor
*Assistant Examiner* — Tania M Pena-Santana
(74) *Attorney, Agent, or Firm* — Sheridan Ross P.C.

(57) ABSTRACT

Systems and methods of providing data to users during or after audio and/or text communication sessions are disclosed. Systems and methods of the present disclosure include receiving text, audio, and/or other data from one or more past or currently occurring communication sessions, receiving a text and/or audio request for information from a user relating to a past or a currently occurring communication session, identifying an answer to the request in the text, audio, and/or other data from the communication session; and presenting the answer to the user in a user-friendly manner via a user interface. Systems and methods include providing answers to queries relating to meetings and/or communication sessions occurring in a series such as recurring meetings.

20 Claims, 6 Drawing Sheets

(56) References Cited

U.S. PATENT DOCUMENTS

2020/0314244 A1   10/2020  Matula et al.
2020/0372140 A1*  11/2020  Jaber .................... G06F 21/31
2021/0043191 A1*   2/2021  Chao .................... G10L 17/22
2023/0029278 A1*   1/2023  Parush Tzur ....... G06F 16/7328

* cited by examiner

SYSTEMS AND METHODS FOR PROVIDING DIGITAL ASSISTANCE RELATING TO COMMUNICATION SESSION INFORMATION

FIELD

The disclosure relates generally to communication applications and particularly to presenting information relating to communication sessions in a user-friendly manner.

BACKGROUND

As electronic user devices such as smart phones, tablets, personal computers, etc., become more commonplace, more and more communication between people occurs via text communication applications and audio/video communication applications such as Avaya Spaces. Besides simple one-to-one communications, communication often takes place between a large number of people.

Communication over the Internet has enabled real-time spread of information. A single communication session may comprise an endless number of text messages, audio recordings, images, and GIFs, alongside a real-time audio/video communication between multiple users.

Audio/video and/or text-based communications are often used by teams or committees of people to communicate. For example, a team may have a weekly meeting to stay up to date on affairs relating to the team. Participants in communication sessions using contemporary software are faced with a challenge of understanding or querying relevant information previously discussed in the communication session or a previous communication session, especially when such communication sessions, or meetings, are held in a series over a period of time. Participants in communication sessions using contemporary software are also faced with a challenge of reinitiating discussion and understanding topics covered during a communication session or meeting once the communication session or meeting ends.

While real-time communication enables remote users to connect over long distances, the average human user cannot monitor real-time communications every moment. Also, if a user cannot attend a meeting or is late, the user may be required to resort to asking attendees for a recap or for notes of the meeting or a portion of the meeting which the user missed. As a result, less efficient communication systems, such as email may be used to keep team members up-to-date. Emails provide useful record keeping, but do not allow for the free flow of ideas between team members. As a result, team members are less capable of collaborating.

What is needed is a communication system capable of resolving the above-described issues with conventional communication systems and providing a way to ensure even those team members who cannot attend a live meeting can stay up-to-date on matters covered during a communication session.

DETAILED DESCRIPTION

The above discussed issues with contemporary communication applications and other needs are addressed by the various embodiments and configurations of the present disclosure. As described herein, an assistant application may be provided in conjunction with a communication application. By interacting with the assistant application, users may be enabled to request information and be provided with information in response to queries. An assistant application may be configured to generate and analyze transcripts from a current meeting and/or previous meetings. A user may ask the assistant application a question relating to one or more meetings and the assistant application may be configured to process the question, identify one or more meetings relating to the question, identify a response to the question, and provide the response to the question to the user. Such a system as described herein provides a rich experience to the user.

The phrases "at least one", "one or more", "or", and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a," "an," "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Any combination of one or more computer readable medium(s) may be utilized. The computer readable medium may be a computer readable signal medium or a computer readable storage medium.

A computer-readable storage medium may be, for example, but should not be considered limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably, and include any type of methodology, process, mathematical operation, or technique.

The term "means" as used herein shall be given its broadest possible interpretation in accordance with 35 U.S.C. § 112(f) and/or § 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

Figure 1:
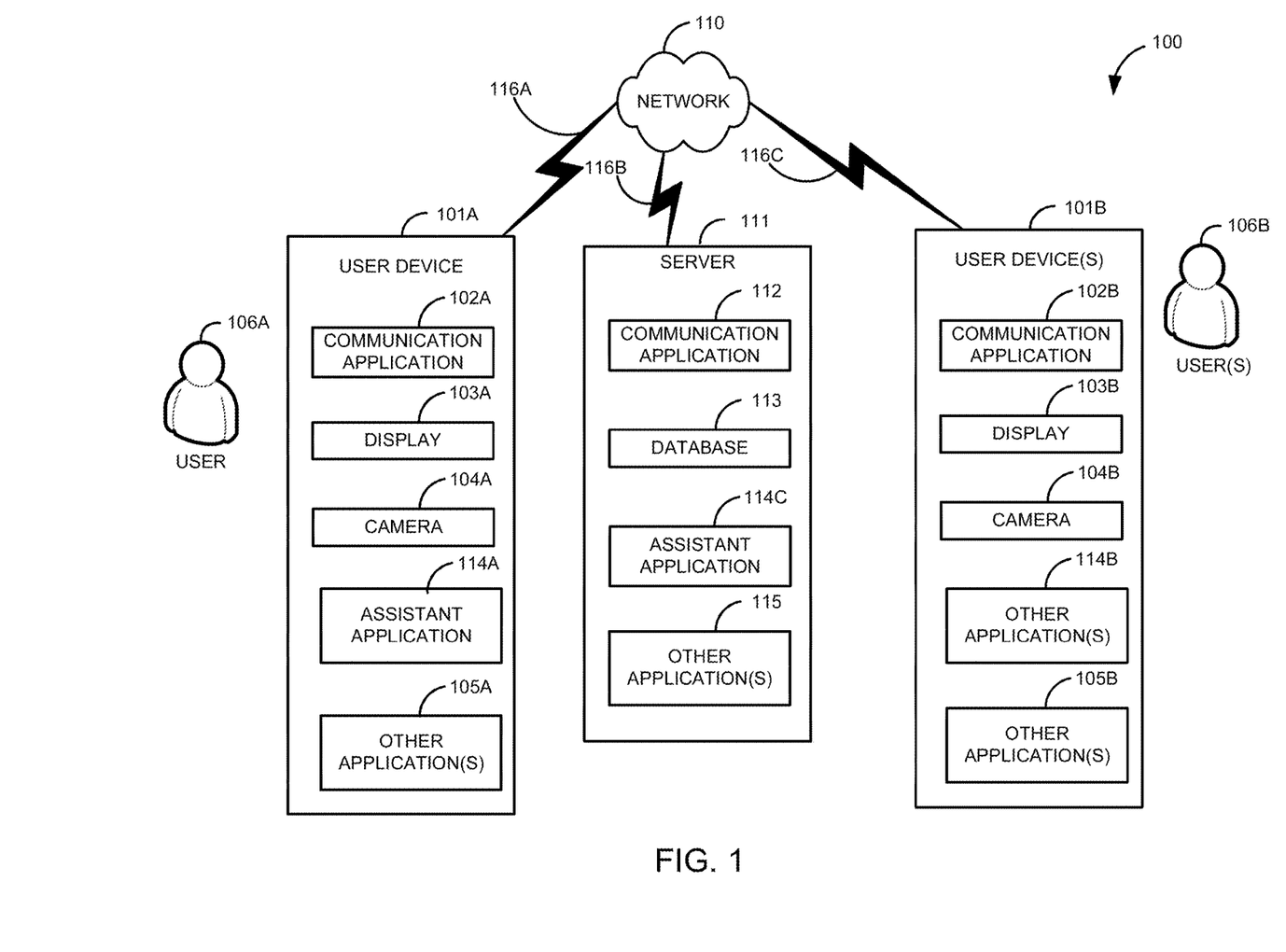
FIG. 1 is a block diagram of a first illustrative system for implementing a communication session in accordance with one or more embodiments of the present disclosure.

FIG. 1 is a block diagram of a first illustrative system 100 for a communication session between one or more users in accordance with one or more of the embodiments described herein. The first illustrative system 100 comprises user communication devices 101A, 101B and a network 110. In addition, users 106A-106B are also shown.

The user communication devices 101A, 101B can be or may include any user device that can communicate on the network 110, such as a Personal Computer ("PC"), a video phone, a video conferencing system, a cellular telephone, a Personal Digital Assistant ("PDA"), a tablet device, a notebook device, a smartphone, and/or the like. The user communication devices 101A, 101B are devices used as endpoints for a communication session. Although only two user communication devices 101A, 101B are shown for convenience in FIG. 1, any number of user communication devices 101 may be connected to the network 110 for establishing a communication session.

The user communication devices 101A, 101B further comprise communication applications 102A, 102B, displays 103A, 103B, and cameras 104A, 104B. It should be appreciated that, in some embodiments, user devices may lack cameras 104A, 104B. Also, while not shown for convenience, the user communication devices 101A, 101B typically comprise other elements, such as a microprocessor, a microphone, a browser, other applications, and/or the like.

In addition, the user communication devices 101A, 101B may also comprise other application(s) 105A, 105B. The other application(s) 105A can be any application, such as, a slide presentation application, a document editor application, a document display application, a graphical editing application, a calculator, an email application, a spreadsheet, a multimedia application, a gaming application, and/or the like. The communication applications 102A, 102B can be or may include any hardware/software that can manage a communication session that is displayed to the users 106A, 106B. For example, the communication applications 102A, 102B can be used to establish and display a communication session.

The displays 103A, 103B can be or may include any hardware display/projection system that can display an image of a video conference, such as a LED display, a plasma display, a projector, a liquid crystal display, a cathode ray tube, and/or the like. The displays 103A-103B can be used to display user interfaces as part of communication applications 102A, 102B.

As described herein, a user device 102A, 102B may execute an application such as an assistant application 114A, 114B. Such an assistant application 114C may also or alternatively be executed by a server. As discussed in greater detail below, an assistant application 114A, 114B, 114C may enable a user of a user device 102A, 102B to request data relating to one or more communication sessions and to receive data in response to the request.

The user communication devices 101A, 101B may also comprise one or more other application(s) 105A, 105B. The other application(s) 105A, 105B may work with the communication applications 102A, 102B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocol, video protocols, Integrated Services Digital Network (ISDN), and the like. Thus, the network 110 is an electronic communication network configured to carry messages via packets and/or circuit switched communications.

The network may be used by the user devices 101A, 101B, and a server 111 to carry out communication. During a communication session, data 116A may be sent and/or received via user device 101A, data 116B may be sent and/or received via server 111, and data 116C may be sent and/or received via user device 101B.

The server 111 may comprise any type of computer device that can communicate on the network 110, such as a server, a Personal Computer ("PC"), a video phone, a video conferencing system, a cellular telephone, a Personal Digital Assistant ("PDA"), a tablet device, a notebook device, a smartphone, and/or the like. Although only one server 111 is shown for convenience in FIG. 1, any number of servers 111 may be connected to the network 110 for establishing a communication session.

The server 111 may further comprise a communication application 112, database(s) 113, assistant application 114C, other application(s) 115, and, while not shown for convenience, other elements such as a microprocessor, a microphone, a browser application, and/or the like. In some embodiments, an assistant application 114 may comprise a voice processing system, a text analysis system, a natural language processing system, or other components. The assistant application 114 may be configured to execute one or more components based on machine learning and/or natural language processing ("NLP"). In some embodiments, machine learning and/or NLP algorithms may be executed by a server or another computer system to carry out the work of analyzing voices, identifying speakers, converting voice to text, analyzing queries, analyzing transcripts, etc., while in some embodiments, a server or other computing system may access one or more third party services provided by cloud service providers for machine learning and/or NLP for topic identification from text messages. In some embodiments, a combination of locally-executed artificial intelligence systems and third party-based systems may be used.

Figure 2A:
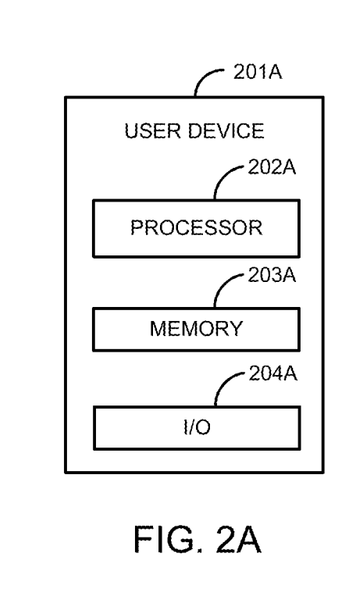
FIG. 2A is a block diagram of a user device system for executing a communication session in accordance with one or more embodiments of the present disclosure.
Figure 2B:
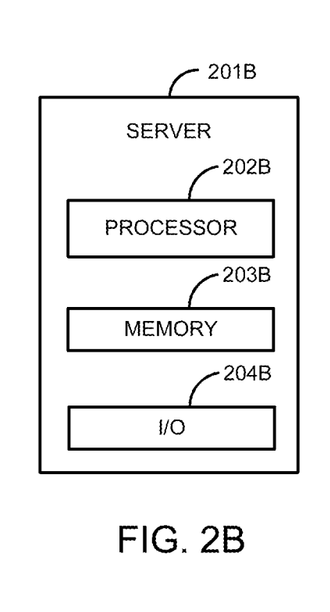
FIG. 2B is a block diagram of a server for executing a communication session in accordance with one or more embodiments of the present disclosure.

FIGS. 2A and 2B illustrate components of an exemplary user device 201A and server 201B for use in certain embodiments as described herein. In some embodiments, a user device 201A may comprise a processor 202A, memory 203A, and input/output devices 204A. Similarly, a server 201B may comprise a processor 202B, memory 203B, and input/output devices 204B.

A processor 202A, 202B may comprise a processor or microprocessor. As used herein, the word processor may refer to a plurality of processors and/or microprocessors operating together. Processors 202A, 202B may be capable of executing software and performing steps of methods as described herein. For example, a processor 202A, 202B may be configured to display user interfaces on a display of a computer device. Memory 203A, 203B of a user device 201A, 201B may comprise memory, data storage, or other non-transitory storage device configured with instructions for the operation of the processor 202A, 202B to perform steps described herein. Accordingly, processes may be embodied as machine-readable and machine-executable code for execution by a processor to perform the steps herein and, optionally, other processing tasks. Input/output devices 204A, 204B may comprise, but should not be considered as limited to, touchscreens, keyboards, mice, microphones, cameras, display devices, network cards, etc.

Illustratively, the user communication devices 101A, 101B, the communication applications, the displays, the application(s), are stored-program-controlled entities, such as a computer or microprocessor, which performs the methods and the processes described herein by executing program instructions stored in a computer readable storage medium, such as a memory (i.e., a computer memory, a hard disk, and/or the like). Although the methods described herein may be shown in a specific order, one of skill in the art would recognize that the steps of systems and methods described herein may be implemented in different orders and/or be implemented in a multi-threaded environment. Moreover, various steps may be omitted or added based on implementation.

Figure 3:
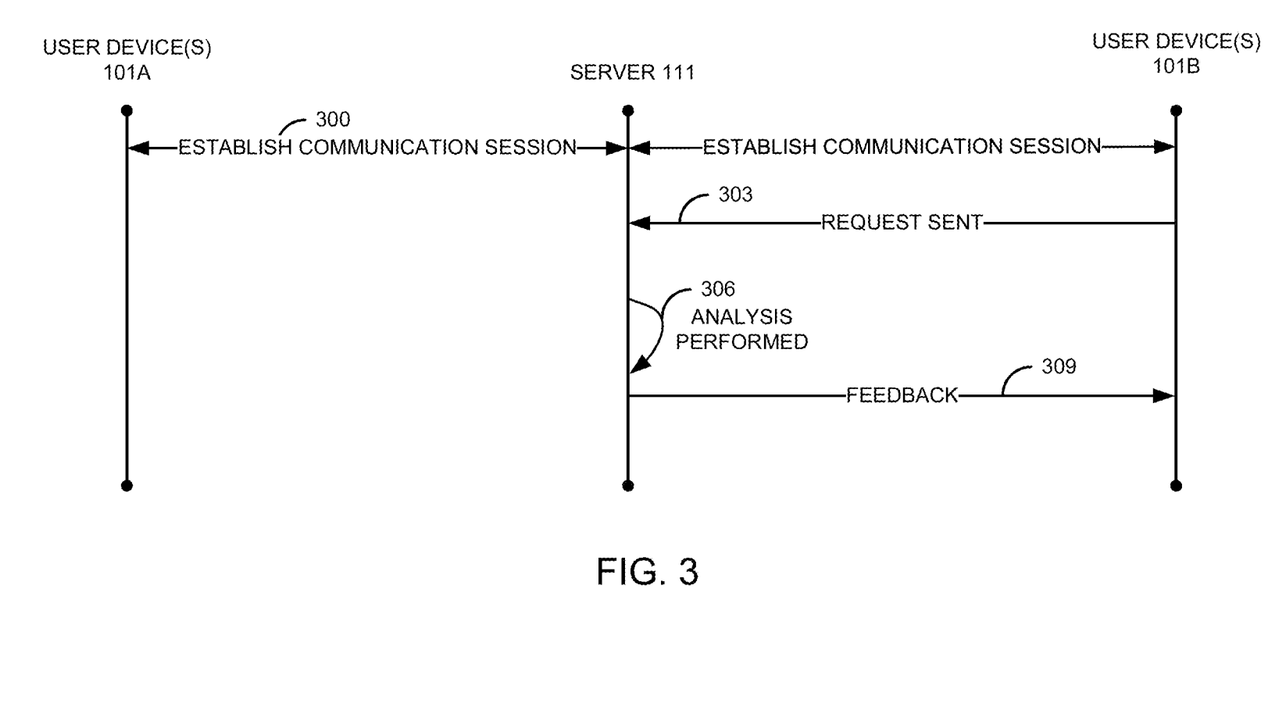
FIG. 3 is a flow diagram of an interchange of data in accordance with one or more embodiments of the present disclosure.

FIG. 3 is a flow diagram of a process using an assistant application to enable a user of a user device 101B to transmit a query via the assistant application and receive data in response to the query. In some embodiments, the user may be one of a plurality of users participating in a communication session. Each user of the plurality of users may operate a separate user device 101A, 101B, and may each be separately enabled to access the same or a separate assistant application. For example, an assistant application may be an application executed by a processor of a user device 101A or may be an application executed by a server 111 hosting a communication session. In the embodiment illustrated in FIG. 3, the assistant application is a process executed by the server 111.

The process illustrated in FIG. 3 starts when a communication session is established at 300. A communication session may be established for example when one user of a user device uses a communication application, such as Avaya Spaces, to begin a communication session with one or more other users of user devices. The users participating in the communication session may be considered as being participants of the communication session.

Once a communication session is established, user devices may be free to join the communication session to communicate with other user devices participating in the communication session. For example, a user device 101B may join the communication session and transmit audio, video, and/or text data via the communication session to other devices participating in the communication session.

During or after a communication session, a user device 101B may be configured to transmit a request for data to the server 111 at 303. In the example illustrated in FIG. 3, the server 111 executes an assistant application. When a user device 101B transmits a request, the assistant application may receive the request, perform an analysis of the request at 306, and provide feedback in response to the request at 309.

It should be appreciated that in some embodiments, the analysis may be performed by the user device 101B itself, and no server interaction may be required. Also, the user device 101B may also execute an assistant application which may be configured to transmit the request to the server 111. For example, the user device 101B may display a graphical user interface enabling a user to input a text request. The text request may be received by an assistant application executing on the user device 101B. The assistant application executing on the user device 101B may use data internal to the user device 101B, data stored on the server 111, or data stored elsewhere to identify and provide a response to the request.

Performing analysis may comprise the user device 101A or the server 111 analyzing a text string within a request received via a graphical user interface and comparing the text string to one or more databases. Databases may comprise transcripts or data generated from transcripts from a current communication session and/or one or more past communication sessions. In some embodiments, transcripts may be stored in memory in a text file or a table. Transcript data may comprise text generated by a voice-to-text or speech analysis system. Transcript data may comprise data in addition to text versions of audio, such as text input by users in a chat during a communication session, a textual identifier of a speaker, a textual identifier of the communication session, a text list of participants in the communication session, an identification of related communication sessions, etc.

In some embodiments, performing analysis may comprise the user device 101A or the server 111 analyzing data in addition to or alternatively to transcript data. For example, any documents, files, presentations, images, etc., which may be shared by a user, such as by sharing a screen or sending a document in a text chat window, may be used as an input dataset for the assistant application.

For example, analysis of requests may comprise polling one or more databases. Each database may comprise data relating to one or more communication sessions. Data relating to a communication session may be generated by an assistant application or another application. Data relating to a communication session may be generated in real-time during a communication session or may be generated following completion of a communication session.

Generation of data relating to a communication session may comprise converting speech to text using, for example, a speech recognition application. For example, during a communication session, a speech recognition application may automatically transcribe the audio received from each participant.

Data relating to a communication session may comprise other data, such as an identifier of a speaker of text within the transcription. For example, the identity of each speaker may be included in the database. The identity of a speaker may be automatically identified, for example, by recording a user identity of a user device from which the audio was received. In some embodiments, voice recognition software may be used to identify a speaker based on a quality of the speech.

Data relating to a communication session may comprise a textual identifier of the communication session. For example, a time, date, place, or other information relating to a communication session may be recorded. Because electronic communication sessions, such as Avaya Spaces calls, may have titles or other metadata related to the communication session, such data may be recorded within a database.

Data relating to a communication session may comprise a text list of participants in the communication session. Participants in the communication session may be identified by a username, an actual name, or another identifier. A participant list may be generated by recording meeting or communication session details, such as a list of confirmed or invited participants, or through identifying speakers using voice recognition.

Data relating to a communication session may comprise an identification of related communication sessions. For example, if a communication session is one of a recurring set of calendar items, each communication session relating to each calendar item may be identified as a related communication session. In some embodiments, communication sessions with the same or similar participants may be identified as related. For example, if a participant list of a first communication session includes a majority of the same participants as a participant list of a second communication session, the first and second communication sessions may be identified as possible related. In some embodiments, the assistant application may be configured to ascertain a degree of confidence as to whether two or more communication sessions are related.

The analysis performed by an assistant application executed by a user device 101A, 101B or server 111 may be performed automatically. For example, a neural network such as a convolutional neural network or other type of artificial intelligence system may be used. In some embodiments, analysis performed by an assistant application may comprise leveraging third party artificial intelligence service providers hosted in a public cloud such as Google AI or a similar provider.

Figure 4:
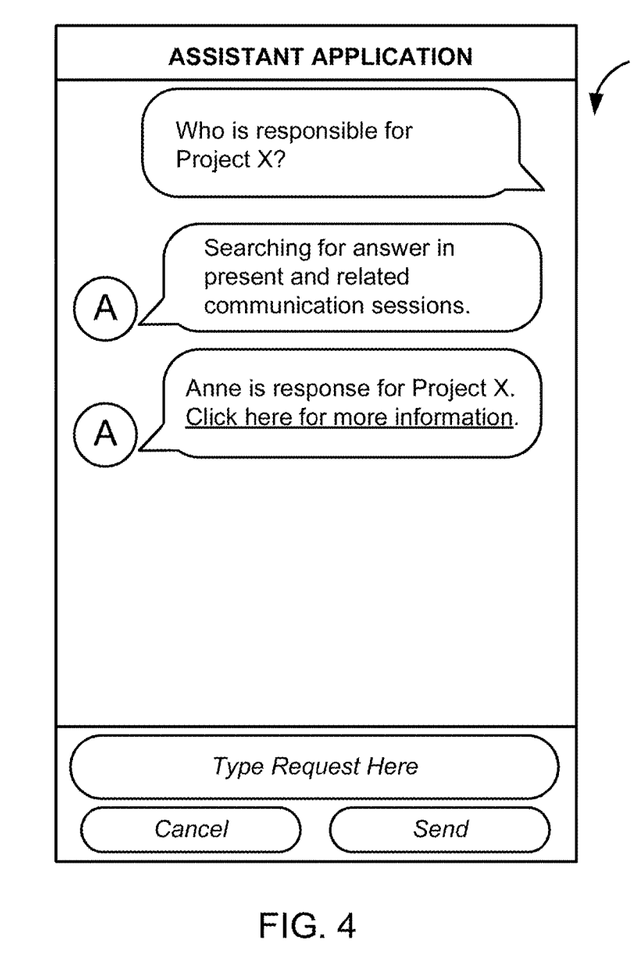
FIG. 4 is an illustration of a user interface in accordance with one or more embodiments of the present disclosure.

As requests are received by an assistant application executed by a user device or a server, each request may be displayed in a user interface 400 such as illustrated in FIG. 4. In the example illustrated in FIG. 4, a first user of a first user device is communicating with an AI personality of the assistant application. As should be appreciated, the conversation including the user of the user device displaying the user interface 400 may be just one of many conversations involving the user.

The assistant application user interface 400 may be displayed on the user device during a communication session such as a team meeting using the same user device or another device. For example, the user may open the assistant application during or after a communication session.

Messages, or requests, sent from the first user of the first user device may be displayed in line with messages received from the assistant application. The user interface 400 may also include a text box enabling the first user of the first user device to input a message to be sent to the assistant application.

As illustrated in FIG. 4, the user may be enabled by the user interface to interact with the assistant application by asking a question or making a request for information. In the example illustrated in FIG. 4, the user has input the text string of "Who is responsible for Project X?" into the text box of the user interface and clicked a send button.

When a request, e.g., a question, has been entered and sent via an assistant application, the assistant application may receive the request. In some embodiments, while a user may interact with an assistant application via a user device, another device, such as a server, may execute the functions of the assistant application. In such situations, the request may be transmitted via a network connection to a server or other device.

Upon receiving the request, the assistant application may process the text of the request. Processing the request may comprise, in some embodiments, inputting the text of the request into a natural language processing (NLP) system or other type of language analysis. Using NLP or another analysis system, the assistant application may interpret the request and based on the interpretation of the request, generate a search prompt. A search prompt may comprise, in some embodiments, a text string including search terms along with Boolean operators. For example, the request of "Who is responsible for Project X" may be interpreted and a search prompt of "responsible AND Project X" may be generated. In some embodiments, a machine learning algorithm may avoid the necessity of generating a search prompt and may instead use the original text string of the request as an input to generate an answer.

Upon receiving a request, the assistant application may also determine one or more databases or files to search. For example, in some embodiments, an assistant application may search only a currently occurring communication session for an answer to a request. Such a system may be useful for participants of non-recurring meetings to learn about what has already been discussed in the meeting. For example, if a user joins a meeting late, the user can avoid interrupting the meeting to get a recap and can instead ask the assistant application any questions.

In some embodiments, determining which databases or files to search may comprise asking the user for more information. In some embodiments, the assistant application may display a prompt requesting the user to input details of a meeting or a set of meetings with which the request is associated. For example, the assistant application may display a prompt of "In which meeting logs should I look for information?" or a similar prompt. In some embodiments, a user may be presented with a calendar view or a dropdown box showing a list of meetings the user may have attended or to which the user may have been invited.

In some embodiments, the assistant application may automatically identify one or more communication sessions or meetings to analyze for information. For example, if the user is currently in a meeting, the assistant application may analyze the currently occurring meeting. The assistant application may also automatically analyze any meetings related to the current meeting. For example, if the currently occurring meeting is one of a recurring set of meetings, the assistant application may analyze all or a number of the past meetings in the set of meetings. In some embodiments, the assistant application may analyze any meetings occurring within a particular time frame, such as within the past six months or past week.

As illustrated in FIG. 4, the assistant application may, upon receiving a request or question, display a message to the user to inform the user the search for an answer has begun. Such a message may comprise, for example, a text string of "Searching for answer in present and related communication session" or similar phrase.

Searching or analyzing communication sessions may comprise determining which databases or files to search for the answer. In some embodiments, a communication session may be associated with a file. The file may store information relating to the communication session as described herein. For example, the file may comprise a transcript of the communication session, a participant list of the communication session, a list of details relating to the communication session, an identity of any other communication sessions related to the communication session, etc.

Whether a search prompt has been generated or whether the assistant application is executing a machine learning or other type of AI system to find the answer, the assistant application may process the text stored within each file associated with each communication session related to the request.

When an answer has been found by the assistant application, the assistant application may display a message to the user via the user interface 400 as illustrated in FIG. 4. Such a message may include a generated text string comprising information gained by the assistant application from one or more files associated with the searched communication sessions. In some embodiments, the message may also comprise a hyperlink which may direct the user to a transcript of the meeting in which the answer was found so the user can view context of the information within the answer and be enabled to learn more information about the items discussed before and after the answer.

Figure 5:
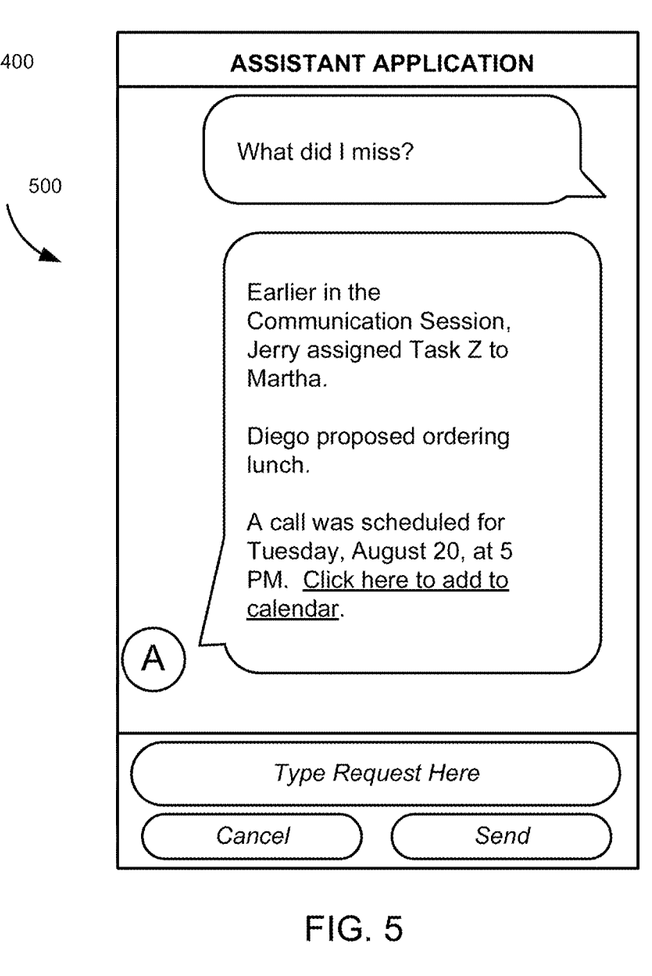
FIG. 5 is an illustration of a user interface in accordance with one or more embodiments of the present disclosure.

As illustrated in FIG. 5, a user may ask a broad question such as "What did I miss?" or a similar request for information. In this way, in the case of a user joining a communication late, the user may be enabled by the assistant application to be presented with an overview or summary of a communication session or a portion of a communication session. Such a request may also be made after a communication session has ended. For example, a user may ask a question such as "What happened in the science meeting on Tuesday?" or a similar question.

The assistant application may be configured to process text, such as a transcript of one or more communication sessions, and extract important information. Information such as the assignment of tasks to people, proposals of new meetings, scheduling information relating to new or already-scheduled meetings, etc. may be identified as important and the assistant application may be configured to process such important information and present the important information in a user-friendly manner. In this way, the assistant application may be configured to present an overview of one or more meetings to provide a user with notes or an outline of items discussed in one or more meetings. In some embodiments, such an outline may be generated in real-time during a meeting and may be displayed in a user interface or stored as a text or other type of file. Outlines, notes, or messages generated by an assistant application may include features such as hyperlinks enabling users to view more information relating to the outline, notes, or message, or to have meetings scheduled during another meeting added to the user's calendar.

Figure 6:
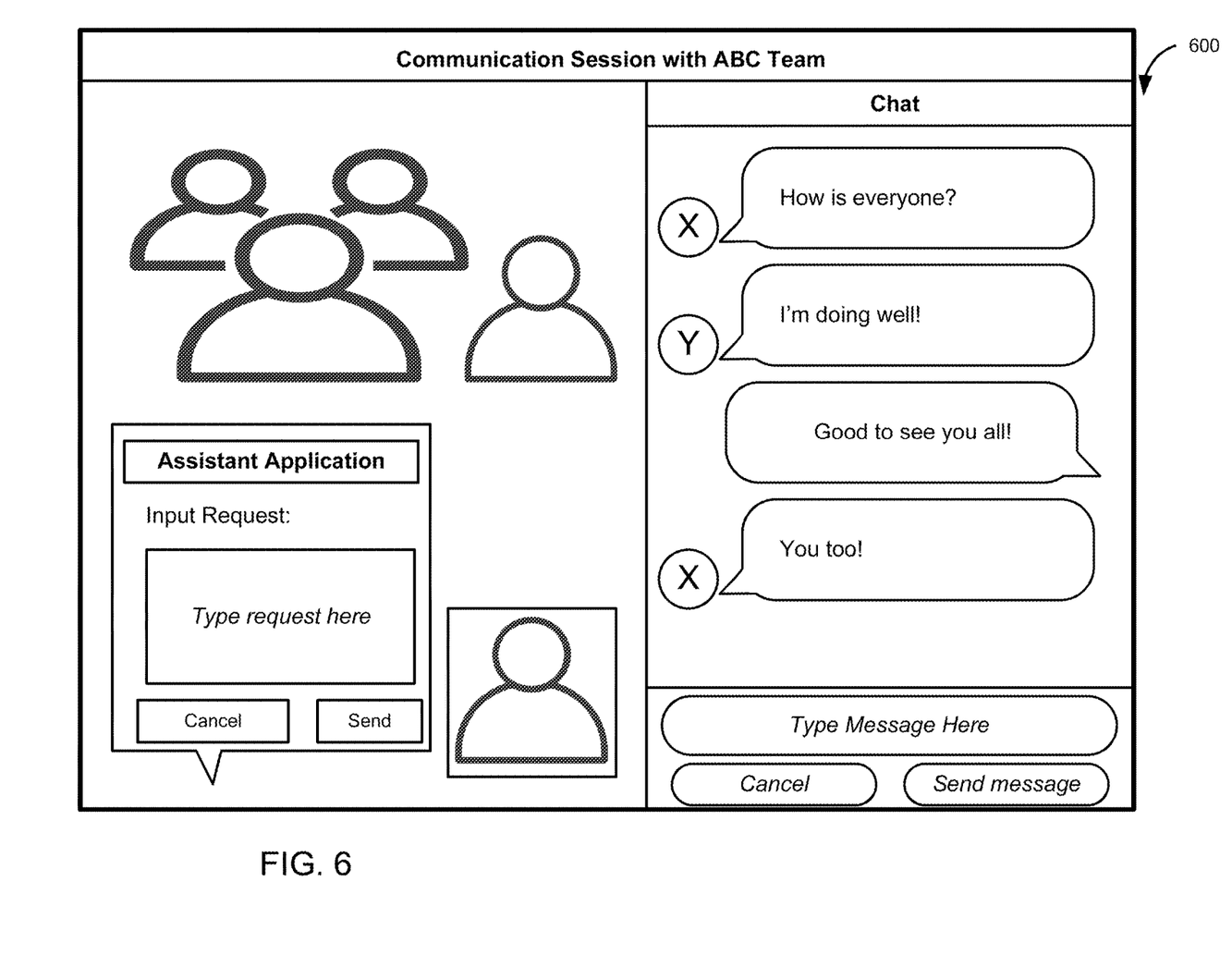
FIG. 6 is an illustration of a user interface in accordance with one or more embodiments of the present disclosure.

As illustrated by the user interface 600 of FIG. 6, a user of a user device may be capable of interacting with an assistant application during a communication session. For example, a communication session user interface 600 may comprise a view of users participating in the communication session, a chat window enabling users to discuss in text during a communication session, and an assistant application window enabling the user of the user device displaying the user interface 600 to request information. Information requested using an assistant application may in some embodiments be private and displayed only to the requesting user, while in other embodiments, requests for information may be shared with other users. In some embodiments, the assistant application may be a feature of the communication session's chat window. For example, if a user asks other users a question, the assistant application may attempt to answer the question regardless of whether the question was directed to the assistant application or to other participants of the communication session. In such an embodiment, the answer to the question may be presented to all participants participating in the chat, or only to the user having requested the information.

Figure 7:
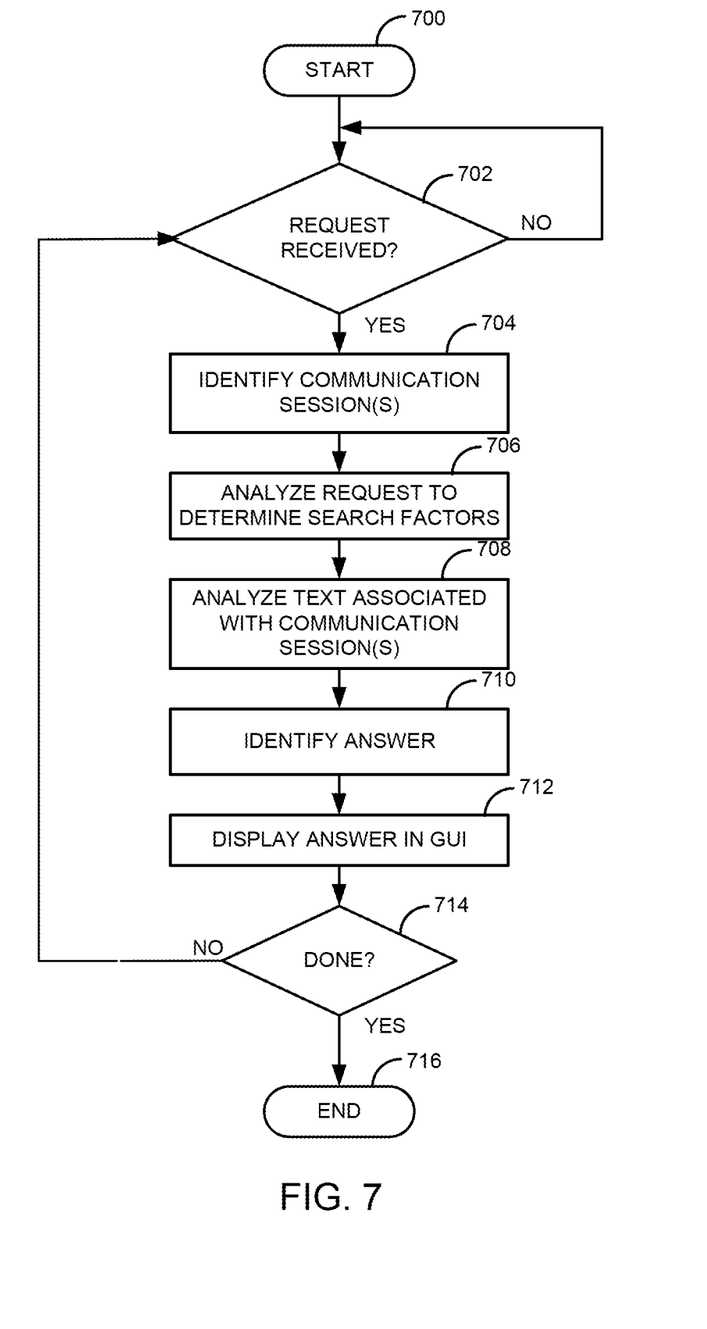
FIG. 7 is a flow diagram of a process in accordance with one or more embodiments of the present disclosure.

As illustrated in FIG. 7, a process of executing an assistant application may be performed by a processor of a user device, a processor of another computing device, or a combination of processors of a number of devices. The process of FIG. 7 may begin at step 700 in which a communication session between two or more user devices has been established or has already occurred. The communication session may be, for example, in the form of a message group using a text communication application, an online discussion such as an Internet forum or a text instant messaging application, a live meeting using a conferencing application such as Avaya Spaces, etc. At step 702, a processor may wait for a message, such as a request for information, to be received. The message may be received from a user device, for example by a user of a user device typing a message into an assistant application user interface and clicking send. Once a request has been received at step 702, the message may be displayed in a messaging application on the user device. In some embodiments, messages to the assistant application may be in the form of audio or text. For example, a user may be enabled to speak questions to an assistant application or type questions via a graphical user interface.

At 704, the assistant application may identify one or more communication sessions associated with the request. In some embodiments, identifying communications associated with the request may comprise determining whether the requesting user is currently participating in a communication session, whether the requesting user has just completed participating in a communication session, or whether the requesting user is scheduled to join a communication session within a particular amount of time. In such embodiments, the assistant application may determine the communication session in which the user is participating, just completed, or will soon participate in is related to the request. In some embodiments, the assistant application may also automatically determine any communication session related to such a communication session is also related to the request. For example, if a request relates to a communication session which is one of a recurring set of communication sessions, the assistant application may determine all or some of the communication sessions in the recurring set of communication sessions are related to the request. It should be appreciated that users may query an assistant application in a number of different styles and sentences with the same general meaning. The assistant application may be capable of understanding a queries in a variety of formats and of pointing to a response despite the varied query styles.

In some embodiments, the assistant application may infer which communication sessions are related to the request by analyzing the request. The assistant application may be configured to determine a communication session relating to the request by comparing words or phrases within the request with words or phrases within transcripts of a number of communication sessions to determine which communication sessions relate to the request.

In some embodiments, the assistant application may determine any communication sessions to which the user making the request has access are related to the request. For example, the assistant application may review privacy settings and determine which communication session files, such as transcripts, are available to the user and may analyze some or all of the communication session files available to the user to determine the proper response.

At 706, the assistant application may analyze the request to determine one or more search factors. In some embodiments, the assistant application may, instead of determining search factors, input the request into an artificial intelligence system which may be trained to process such requests and determine answers. In some embodiments, the assistant application may process the request to generate a search phrase. For example, a request of "Who is leading meeting F?" may be processed to generate a search phrase which may enable the assistant application to search through transcripts of meetings to find the answer.

At 708, the assistant application may analyze text associated with the one or more communication sessions identified in step 704, discussed above. Text associated with a communication session may in some embodiments be a transcript of the communication session. Transcripts may be automatically generated during or after a communication session by the assistant application or by another service executing on a computer system. Text associated with a communication session may also comprise information such as a list of participants, meeting date and time data, meeting organizer data, etc. Any such text data may be used to find information relating to a request.

At 710, the assistant application may identify an answer to the request. Identifying an answer to a request may comprise, in some embodiments, utilizing an artificial intelligence algorithm to process the request and generate an output. The output may be a quote or an edited quote from text associated with a communication session related to the request. For example, upon identifying data including an answer to the request within communication session data, the assistant application may process the identified data to generate a response. The response may be generated using NLP or other language system. In some embodiments, an artificial-intelligence-based assistant application may be capable of making use of one or more machine learning libraries or databases. Machine learning libraries or databases may be used to train an artificial intelligence system to process requests and identify answers.

In some embodiments, if the assistant application fails to identify an answer or is otherwise not capable of answering a question or request, the assistant application may be configured to identify a participant of a present meeting or a previous meeting who may be capable of providing an answer. Identifying a participant who may be capable of providing an answer may comprise identifying one or more participants who have spoken on a topic relating to a topic to which the question or request relates during a communication session. For example, if a first user asks the assistant application, "Who is in charge of Project R?" and the assistant application cannot find an answer as to who is in charge of Project R after searching through databases of transcripts or other meeting details, the assistant application may instead identify a second user who has mentioned or discussed Project R. The assistant application may then prompt the first user to contact the second user. In some embodiments, the assistant application may be configured to open a new communication channel with the participant having addressed the topic. For example, the assistant application may provide a hyperlink to the requesting user to enable the requesting user to quickly contact the user having addressed the topic.

At 712, the assistant application may display the generated response in a user-friendly format in the user interface. In some embodiments, the generated response may be displayed in the form of a message sent from an AI personality using a messaging application. In some embodiments, the generated response may be displayed to other users, such as other participants in a currently occurring communication session. In some embodiments, in addition to or alternative to providing answers in the form of text, the assistant application may be capable of providing answers in audio such as by use of a text-to-speech system.

Embodiments of the present disclosure include a computer-implemented method comprising: receiving, with a processor, text from a communication session; receiving, with the processor, a request for information from a user; identifying, with the processor, an answer to the request in the text from the communication session; and displaying, with the processor, the answer to the user via a graphical user interface.

Aspects of the above method include the method further comprising, in response to receiving the request, identifying, with the processor, the communication session.

Aspects of the above method include wherein the user is participating in a second communication session when the request is received.

Aspects of the above method include wherein the user participated in a second communication session prior to the request being received.

Aspects of the above method include wherein identifying the communication session comprises identifying, with the processor, one or more communication sessions related to the received request.

Aspects of the above method include wherein the user is participating in the communication session when the request is received.

Aspects of the above method include wherein identifying the answer in the text comprises executing, with the processor, a natural language processing system.

Aspects of the above method include wherein identifying the answer comprises identifying, with the processor, a speaker of a text string within the text from the communication session.

Embodiments include a device comprising: a processor; and a computer-readable storage medium storing computer-readable instructions which, when executed by the processor, cause the processor to execute a method, the method comprising: receiving text from a communication session; receiving a request for information from a user; identifying an answer in the text from the communication session; and presenting the answer to the user via a user interface.

Aspects of the above device include wherein the method further comprises in response to receiving the request, identifying the communication session.

Aspects of the above device include wherein the user is participating in a second communication session when the request is received.

Aspects of the above device include wherein the user participated in a second communication session prior to the request being received.

Aspects of the above device include wherein identifying the communication session comprises identifying one or more communication sessions related to the received request.

Aspects of the above device include wherein the user is participating in the communication session when the request is received.

Aspects of the above device include wherein identifying the answer in the text comprises executing a natural language processing system.

Aspects of the above device include wherein identifying the answer comprises identifying a speaker of a text string within the text from the communication session.

Embodiments include a computer program product comprising: a non-transitory computer-readable storage medium having computer-readable program code embodied therewith, the computer-readable program code configured, when executed by a processor, to execute a method, the method comprising: receiving text from a communication session; receiving a request for information from a user; identifying an answer in the text from the communication session; and presenting the answer to the user via a user interface.

Aspects of the above computer program product include wherein the method further comprises in response to receiving the request, identifying the communication session.

Aspects of the above computer program product include wherein the user is participating in a second communication session when the request is received.

Aspects of the above computer program product include wherein the user participated in a second communication session prior to the request being received.

Aspects of the above computer program product include wherein identifying the communication session comprises identifying one or more communication sessions related to the received request.

Aspects of the above computer program product include wherein the user is participating in the communication session when the request is received.

Aspects of the above computer program product include wherein identifying the answer in the text comprises executing a natural language processing system.

Aspects of the above computer program product include wherein identifying the answer comprises identifying a speaker of a text string within the text from the communication session.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, Rockchip RK3399 processor, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer, such as an applet, JAVA®, CGI script, or any suitable programming language, as a resource residing on a server or computer workstation, as a routine embedded in a dedicated measurement system, system component, or the like. In some embodiments, multiple programming languages may be used to develop different components of the system. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A computer-implemented method comprising:
receiving, with a processor, from a first user, a request for information;
based on the request for the information, identifying, with the processor, a first communication session;
accessing, with the processor, text data comprising a transcript of the first communication session from a database;
processing, with the processor, the transcript of the first communication session using a natural language processing system to i) when the natural language processing system is capable of generating an answer to the request for the information, generate the answer, and ii) when the natural language processing system is not capable of generating the answer, identify a second user that made a statement within the text data about the information requested by the first user; and
displaying, by the processor, to the first user via a graphical user interface i) an identity of the second user and a prompt for the first user to contact the second user when the natural language processing system is not capable of generating the answer, and ii) when the natural language processing system is capable of generating the answer, the answer including first text generated by the natural language processing system which immediately satisfies the request for the information when the first user views the first text on the graphical user interface.

2. The method of claim 1, wherein the request for the information is received in a second communication session, and wherein the answer includes second text that provides an option to gather additional information associated with the answer.

3. The method of claim 2, wherein the first communication session ended prior to receiving the request for the information, and wherein the second text comprises a hyperlink that links to the transcript of the first communication session.

4. The method of claim 3, wherein identifying the first communication session comprises identifying, with the processor, a plurality of communication sessions related to the request for the information.

5. The method of claim 1, wherein identifying the answer to the request comprises identifying, with the processor, a speaker of a text string within the transcript of the first communication session.

6. The method of claim 1, wherein the prompt for the first user to contact the second user comprises a hyperlink that enables the first user to contact the second user.

7. A device comprising:
a processor; and
a computer-readable storage medium storing computer-readable instructions which, when executed by the processor, cause the processor to execute a method, the method comprising:
receiving, from a first user, a request for information;
based on the request for the information, identifying a first communication session;
accessing text data comprising a transcript of the first communication session from a database;
processing the transcript of the first communication session using a natural language processing system to i) when the natural language processing system is capable of generating an answer to the request for the information, generate the answer to the request for the information, and ii) when the natural language processing system is not capable of generating the answer, identify a second user that made a statement within the text data about the information requested by the first user; and
displaying to the first user via a graphical user interface i) an identity of the second user and a prompt for the first user to contact the second user when the natural language processing system is not capable of generating the answer, and ii) when the natural language processing system is capable of generating the answer, the answer including first text generated by the natural language processing system which immediately satisfies the request for the information when the first user views the first text on the graphical user interface.

8. The device of claim 7, wherein the request for the information is received in a second communication session.

9. The device of claim 8, wherein the first communication session ended prior to receiving the request for the information.

10. The device of claim 9, wherein identifying the first communication session comprises identifying a plurality of communication sessions related to the request for the information.

11. The device of claim 7, wherein identifying the answer to the request comprises identifying a speaker of a text string within the transcript of the first communication session.

12. A computer program product comprising:
a non-transitory computer-readable storage medium having computer-readable program code embodied therewith, the computer-readable program code configured, when executed by a processor, to execute a method, the method comprising:
receiving, from a first user, a request for information;
based on the request for the information, identifying a first communication session;
accessing text data comprising a transcript of the first communication session from a database;
processing the transcript of the first communication session using a natural language processing system to i) when the natural language processing system is capable of generating an answer to the request for the information, generate the answer to the request for the information, and ii) when the natural language processing system is not capable of generating the answer, identify a second user that made a statement within the text data about the information requested by the first user; and
displaying to the first user via a graphical user interface i) an identity of the second user and a prompt for the first user to contact the second user when the natural language processing system is not capable of generating the answer, and ii) when the natural language processing system is capable of generating the answer, the answer including first text generated by the natural language processing system which immediately satisfies the request for the information when the first user views the first text on the user graphical interface.

13. The computer program product of claim 12, wherein the request for the information is received in a second communication session.

14. The computer program product of claim 12, wherein identifying the answer to the request comprises identifying a speaker of a text string within the transcript of the first communication session.

15. The computer program product of claim 13, wherein the first communication session ended prior to receiving the request for the information.

16. The computer program product of claim 15, wherein identifying the first communication session comprises identifying a plurality of communication sessions related to the request for the information.

17. The computer program product of claim 12, wherein the prompt for the first user to contact the second user comprises a hyperlink that enables the first user to contact the second user.

18. The method of claim 1, wherein the request is a text message input by the first user, wherein the method further comprises displaying the request in the graphical user interface and processing the request using the natural language processing system.

19. The device of claim 7, wherein the request is a text message input by the first user, wherein the method further comprises displaying the request in the user interface and processing the request using the natural language processing system.

20. The computer program product of claim 12, wherein the request is a text message input by the first user, wherein the method further comprises displaying the request in the user interface and processing the request using the natural language processing system.

* * * * *